United States Patent
Zhu et al.

(10) Patent No.: US 9,239,593 B2
(45) Date of Patent: Jan. 19, 2016

(54) INFORMATION PROCESSING EQUIPMENT

(75) Inventors: Yanlin Zhu, Beijing (CN); Huang Dai, Beijing (CN); Wei Zhang, Beijing (CN); Zhifeng Yang, Beijing (CN); Wenlin Hou, Beijing (CN); Pei Wang, Beijing (CN); Daye Yang, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 163 days.

(21) Appl. No.: 14/114,285

(22) PCT Filed: Apr. 26, 2012

(86) PCT No.: PCT/CN2012/074751
§ 371 (c)(1),
(2), (4) Date: Oct. 28, 2013

(87) PCT Pub. No.: WO2012/146186
PCT Pub. Date: Nov. 1, 2012

(65) Prior Publication Data
US 2014/0049909 A1 Feb. 20, 2014

(30) Foreign Application Priority Data

Apr. 27, 2011 (CN) ............... 2011 2 0128573 U
Sep. 13, 2011 (CN) ............... 2011 1 0269076

(51) Int. Cl.
*G06F 1/16* (2006.01)
(52) U.S. Cl.
CPC ............ *G06F 1/1633* (2013.01); *G06F 1/1654* (2013.01); *G06F 1/1669* (2013.01); *G06F 1/1698* (2013.01)
(58) Field of Classification Search
CPC ...................................................... G06F 16/16
USPC ............................................... 361/679.41
See application file for complete search history.

(56) References Cited

U.S. PATENT DOCUMENTS 6,430,038 B1 * 8/2002 Helot et al. ............. 361/679.05
7,380,143 B2 * 5/2008 Gold et al. .................... 713/300
(Continued)

FOREIGN PATENT DOCUMENTS

CN 2378760 Y 5/2000
CN 2465229 Y 12/2001
(Continued)

OTHER PUBLICATIONS

First Office Action dated Oct. 10, 2014 from corresponding Chinese Application No. CN 201110269076.0 (10 pages including English translation).
(Continued)

*Primary Examiner* — Forrest M Phillips
(74) *Attorney, Agent, or Firm* — Brinks Gilson & Lione; G. Peter Nichols

(57) ABSTRACT

An information processing equipment is described. The equipment includes: a first shell being configured to contain an arithmetic unit, a second shell being configured to contain a display unit, a third shell being configured to contain an input unit, a first connect unit being configured to separately connect the second shell and the third shell; and a second connect unit being configured to separately connect the first shell with the third shell. When the first shell, the second shell and the third shell are separated from each other, the display unit wirelessly exchanges data with the arithmetic unit and the input unit wirelessly exchanges data with the arithmetic unit.

16 Claims, 8 Drawing Sheets

(56) References Cited

U.S. PATENT DOCUMENTS

| | | | |
|---|---|---|---|
| 7,492,579 B2 * | 2/2009 | Homer et al. | 361/679.41 |
| 8,264,310 B2 * | 9/2012 | Lauder et al. | 335/219 |
| 8,824,136 B1 * | 9/2014 | Interian et al. | 361/679.41 |
| 8,922,982 B1 * | 12/2014 | Chen | 361/679.17 |
| 2012/0170204 A1 * | 7/2012 | Ahn et al. | 361/679.41 |
| 2013/0335914 A1 * | 12/2013 | Lee | 361/679.41 |

FOREIGN PATENT DOCUMENTS

| | | |
|---|---|---|
| CN | 2498647 A | 7/2002 |
| CN | 2609043 Y | 3/2004 |
| CN | 2791716 Y | 6/2006 |
| CN | 2927150 Y | 7/2007 |
| CN | 201063125 Y | 5/2008 |
| CN | 201163378 Y | 12/2008 |
| CN | 101853052 | 10/2010 |
| CN | 20178844 U | 4/2011 |
| CN | 202067181 U | 12/2011 |

OTHER PUBLICATIONS

PCT/CN2012/074751 International Search Report dated Jul. 12, 2012 (4 pages including English translation).

* cited by examiner

INFORMATION PROCESSING EQUIPMENT

This application claims priority to International Application No. PCT/CN2012/074751 filed Apr. 26, 2012; Chinese application no. 201120128573.4 filed Apr. 27, 2011; and Chinese application no. 201110269076.0 filed Sep. 13, 2011, the entire contents of each are incorporated herein by reference.

BACKGROUND

The present invention relates to information processing apparatus, and more particularly, the present invention relates to information processing apparatus having a plurality of usage forms.

In recent years, usage of the information processing apparatus such as notebook computer becomes increasingly wide. In procedure of development of the notebook computer, the form thereof does not have any change basically. The current notebook computer has poor support to touch, and the usage form thereof is relatively unitary. Further, though the information processing apparatus such as tablet computer has good support to touch and is very portable, the input (for example, text input) of this kind of information processing apparatus is not convenient.

SUMMARY

In order to solve the above-described technical problem in prior arts, according to one aspect of embodiment of the present invention, there is provided an information processing apparatus including: a first housing configured to accommodate an arithmetic unit; a second housing configured to accommodate a display unit; a third housing configured to accommodate an input unit; a first connection unit configured to connect the second housing with the third housing separably; and a second connection unit configured to connect the first housing with the third housing separably, wherein when the first housing, the second housing and the third housing are separated with each other, the display unit exchanges data with the arithmetic unit in a wireless manner, and the input unit exchanges data with the arithmetic unit in a wireless manner.

Further, according to one embodiment of the present invention, a first wireless communication unit is further included in the first housing; a second wireless communication unit is further included in the second housing; and a third wireless communication unit is further included in the third housing; and the display unit exchanges data with the arithmetic unit through the first wireless communication unit and the second wireless communication unit, and the input unit exchanges data with the arithmetic unit through the first wireless communication unit and the third wireless communication unit.

Further, according to one embodiment of the present invention, a first end of the first connection unit connects with the first housing in a push and pull manner, and/or, a second end of the first connection unit connects with the second housing in a push and pull manner.

Further, according to one embodiment of the present invention, the second connection unit connects the first housing with the third housing by absorption; a first portion of the second connection unit is arranged on the first housing, and a second portion of the second connection unit is arranged on the third housing.

Further, according to one embodiment of the present invention, the first portion of the second connection unit is magnet; and the second portion of the second connection unit is magnetic core.

Further, according to one embodiment of the present invention, the arithmetic unit includes a mainboard component, a processor component, a radiator component, a display output component and a storage component.

Further, according to one embodiment of the present invention, the display unit is a touch screen.

Further, according to one embodiment of the present invention, a second power supply unit configured to supply power to the arithmetic unit is further included in the first housing; and a first power supply unit configured to supply power to the display unit is further included in the second housing.

Further, according to one embodiment of the present invention, a first circuit is provided on the first connection unit so that data is exchanged via the first circuit when the second housing and the third housing are connected through the first connection unit; and a second circuit is provided on the second connection unit so that data is exchanged via the second circuit when the first housing and the third housing are connected through the second connection unit.

With the above-described configuration, the information processing apparatus according to the embodiment of the present invention has a plurality of usage forms, and can be switched between the above-described usage forms flexibly, therefore, the information processing apparatus according to the embodiment of the present invention can satisfy different usage requirements of the user easily.

BRIEF DESCRIPTION OF THE DRAWINGS

In order to describe the technical solution of the embodiments of the present invention more clearly, the accompanying drawings necessary for the description of the embodiments are explained briefly. The accompanying drawings in the following description are only exemplary embodiments of the present invention.

DETAILED DESCRIPTION

Figure 1:
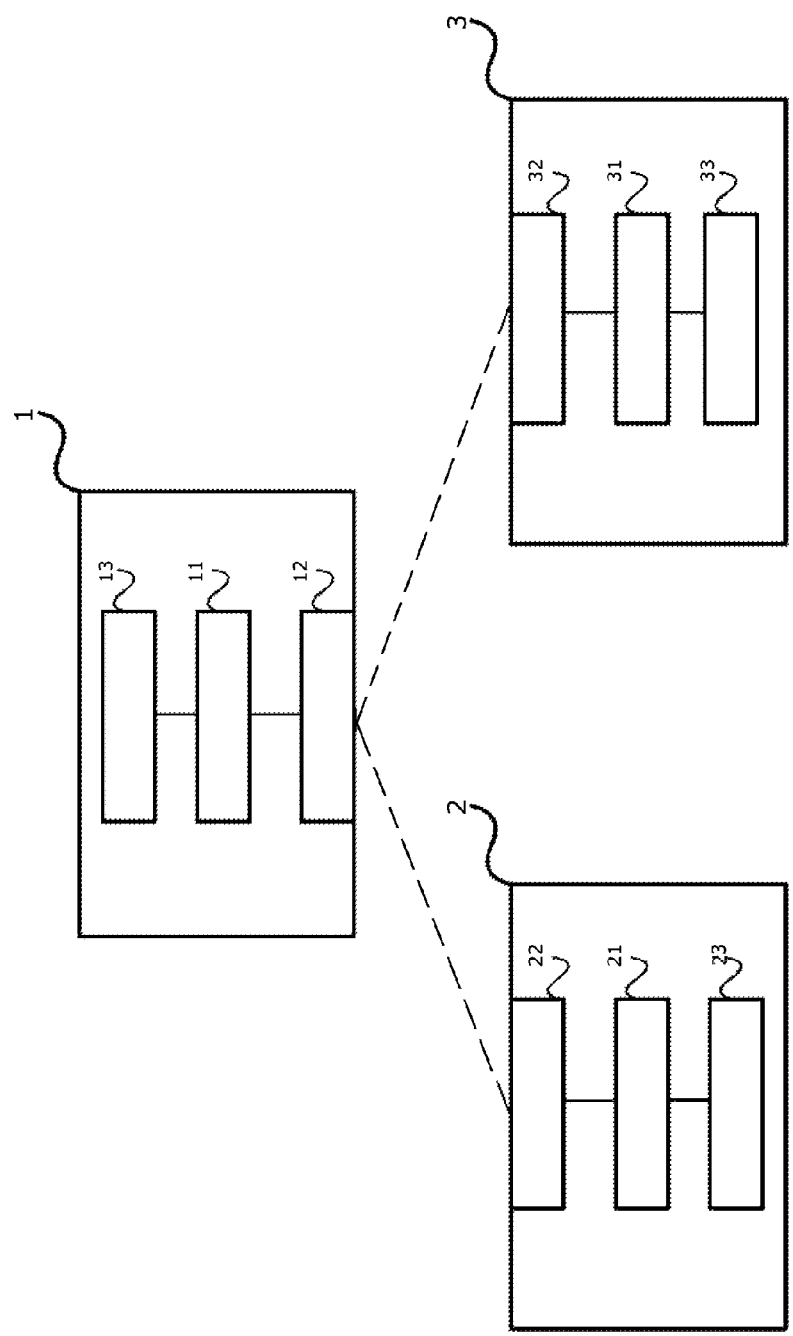
FIG. 1 is a schematic diagram illustrating the structure of the information processing apparatus according to the embodiment of the present invention.

The respective embodiments according to the present invention are described in detail with reference to the accompanying drawings. Here, it is noted that the same reference numbers are given to constituent parts with substantially same or similar structure and function in the drawings, and the repetitive descriptions thereof are omitted.

FIG. 1 is a schematic diagram illustrating the structure of the information processing apparatus according to the embodiment of the present invention. As shown in FIG. 1, the information processing apparatus according to the present invention can include a first housing 1, a second housing 2 and a third housing 3, a first connection unit 4 and a second connection unit 5.

According to embodiment of the present invention, the first housing 1 may be made of plastic or metal, and is for accommodating an arithmetic unit 11. The second housing 2 may be made of plastic or metal and is for accommodating a display unit 21. The third housing 3 can be made of plastic or metal and is for accommodating an input unit 31. Here, the arithmetic unit 11 can include a mainboard, a processor, a radiator, a graphic card and a storage (for example, a hard disk or a flash memory) or the like. The display unit 21 can be any kinds of display (for example, an LCD, an OLED or the like). The input unit 31 can include a keyboard and a touch panel or the like.

Figure 2:
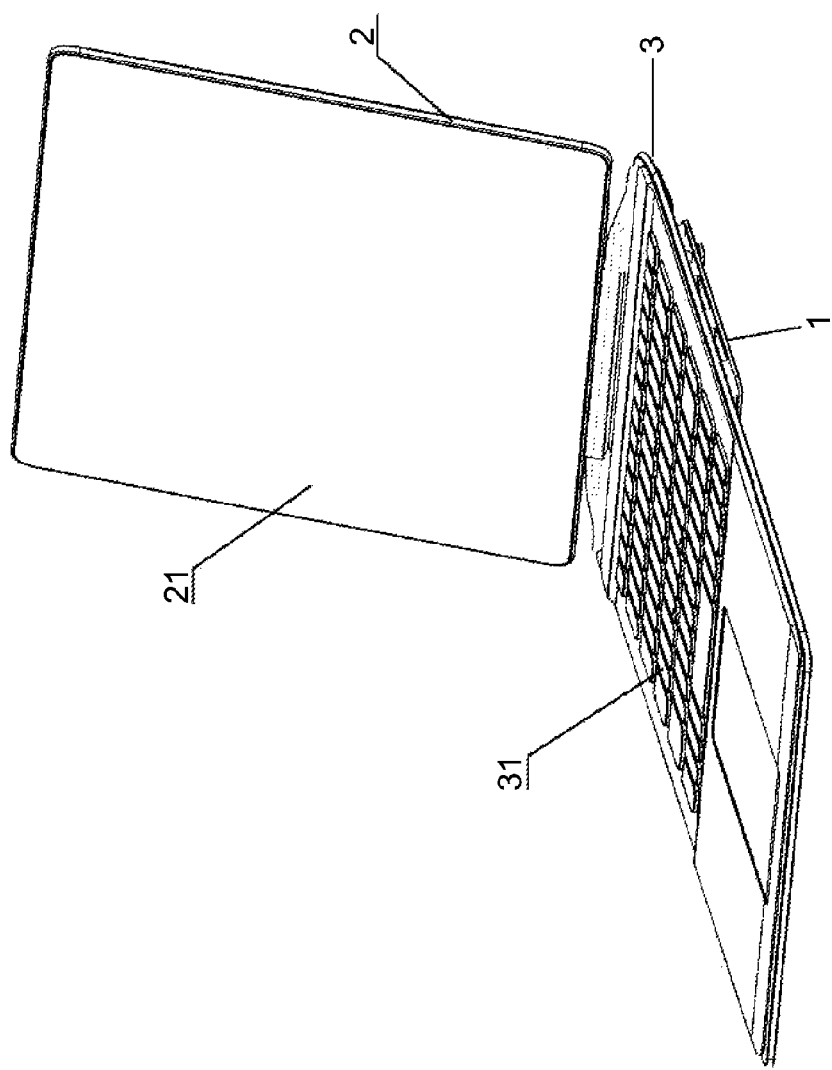
FIG. 2 is a schematic diagram illustrating the usage form of the information processing apparatus according to the embodiment of the present invention.
Figure 3:
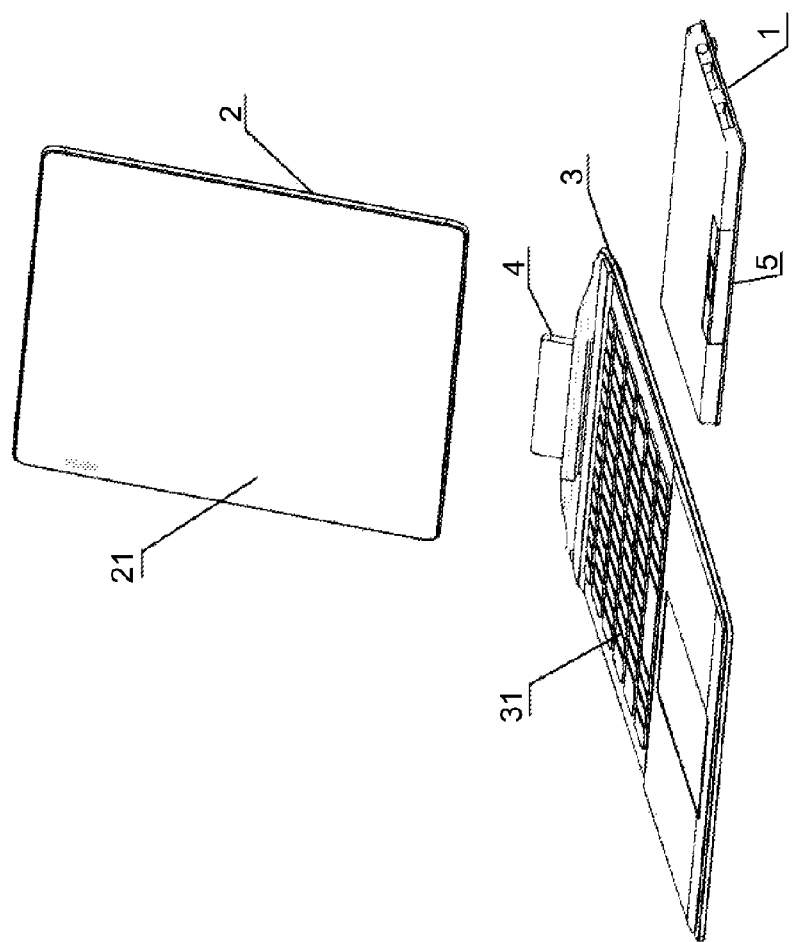
FIG. 3 is a schematic diagram illustrating another usage form of the information processing apparatus according to the embodiment of the present invention.

The first connection unit 4 can connect the second housing 2 with the third housing 3 together. Further, the second housing 2 and the third housing 3 are separable. In particular, the first connection unit 4 can be constituted by a plug and a slot. For example, the plug portion of the first connection unit 4 can be arranged on one end (for example, the back end face) of the third housing 3 for accommodating the input unit 31, and the slot portion can be arranged on one end (for example, the bottom end face) of the second housing 2 for accommodating the display unit 21. Thus, one end (the end of plug) of the first connection unit 4 can connect with the second housing 2 in a push and pull manner (i.e., the plug is assembled with the slot). Further, according to another embodiment of the present invention, the first connection unit 4 can be constituted by plugs on two ends and slots on the second housing 2 and the third housing 3. In this case, both ends of the first connection unit 4 can connect with the second housing 2 (for example, the bottom end face) and the third housing 3 (for example, the back end face) in push and pull manner. Further, the first connection unit 4 may also be constituted by a plug arranged on the second housing 2 (for example, the bottom end face) and a slot arranged on the third housing 3 (for example, the back end face). According to the above configuration, the second housing 2 and the third housing 3 can be connected separably by the first connection unit 4. Here, FIG. 2 illustrates a case in which the second housing 2 is connected with the third housing 3, and FIG. 3 illustrates a case in which the second housing 2 is separated from the third housing 3. Further, according to one embodiment of the present invention, a part of the first connection unit 4 arranged on the third housing 3 is rotatable, so that the second housing 2 and the third housing 3 can be opened and closed as a notebook when the second housing 2 and the third housing 3 are connected.

The second connection unit 5 can connect the first housing 1 and the third housing 3 together. Further, the first housing 1 and the third housing 3 are also separable. In particular, the second connection unit 5 can connect the first housing 1 with the third housing 3 by means of absorption. For example, a part of the second connection unit 5 can be arranged on the first housing 1 (for example, the top or bottom end face), and the other part of the second connection unit 5 can be arranged on the third housing 3 (for example, the bottom end face), and the two parts of the second connection unit 5 can be inter-attracted so that the first housing 1 and the third housing 3 are connected together, and the first housing 1 can be separated from the third housing 3 by applying an external force. For example, a part of the second connection unit 5 may be magnet, and the other part of the second connection unit 5 may be magnetic core. Further, the embodiments of the present invention are not limited thereto, one part and the other part of the second connection unit 5 may be magnets with opposite polarity. Here, FIG. 2 illustrates the case in which the first housing 1 is connected with the third housing 3, and FIG. 3 illustrates a case in which the first housing 1 is separated from the third housing 3. Here, it is noted that, though FIGS. 2 and 3 illustrate the case that the top end face of the first housing 1 is connected to the bottom end face of the third housing 3, the embodiments of the present invention are not limited thereto, as long as the first housing 1 does not influence the user to use the input unit 31 (for example, a keyboard and a touch panel) on the third housing 3, other end faces of the first housing 1 and the third housing 3 can be connected. Further, it is obvious that the first housing 1 and the third housing 3 can be connected together in push and pull manner.

According to embodiment of the present invention, when the first housing 1, the second housing 2 and the third housing 3 are separated with each other, in order to implement interaction of the respective components in the first housing 1, the second housing 2 and the third housing 3, the display unit 21 can exchange data with the arithmetic unit 11 in a wireless manner, and the input unit 31 can exchange data with the arithmetic unit 11 in a wireless manner.

In particular, a first wireless communication unit 12 can be further included in the first housing 1. A second wireless communication unit 22 can be further included in the second housing 2. Further, a third wireless communication unit 32 can be further included in the third housing 3. Here, the first wireless communication unit 12, the second wireless communication unit 22 and the third wireless communication unit 32 can be any kinds of wireless communication module (for example, wifi, blue-tooth, infrared ray or the like).

When the first housing 1, the second housing 2 and the third housing 3 are separated with each other, the display unit 21 can exchange data with the arithmetic unit 11 through the first wireless communication unit 12 and the second wireless communication unit 22. Further, the input unit 31 can exchange data with the arithmetic unit 11 through the first wireless communication unit 12 and the third wireless communication unit 32.

The procedures of the display unit 21 exchanging data with the arithmetic unit 11 and the input unit 31 exchanging data with the arithmetic unit 11 are described as follows.

In general, the first wireless communication unit 12, the second wireless communication unit 22 and the third wireless communication unit 32 may have an apparatus ID for identifying the identify thereof, therefore, when the arithmetic unit 11, the display unit 21 and the input unit 31 communicate through the first wireless communication unit 12, the second wireless communication unit 22 and the third wireless communication unit 32 respectively, they may recognise each other by the apparatus ID of the first wireless communication unit 12, the second wireless communication unit 22 and the third wireless communication unit 32.

For example, in the case that the first housing 1, the second housing 2 and the third housing 3 are separated with each other, if the user uses the input unit 31 provided on the third housing 3 (for example, using the keyboard to input text), the input unit 31 generates predetermined data and sends the predetermined data to the third wireless communication unit 32. Since this data need to be processed by the arithmetic unit 11, this data needs to be sent to the arithmetic unit 11 in the first housing 1. In this case, pairing of communication units is carried out by using the apparatus ID of the first wireless communication unit 12 and the third wireless communication unit 32, and when the pairing of communication units is completed, the arithmetic unit 11 and the input unit 31 can transmit data by the paired first wireless communication unit 12 and third wireless communication unit 32, so that data generated by the input unit 31 can be transmitted to the arithmetic unit 11 to be carried out with predetermined processing.

Similarly, when the arithmetic unit 11 executes a predetermined program, and needs to display image on the display unit 21, the image data needs to be sent to the display unit 21 on the second housing 2. In this case, pairing of communication units is carried out by using the apparatus ID of the first wireless communication unit 12 and the second wireless communication unit 22, and after the pairing of communication units is completed, the arithmetic unit 11 and the display unit 21 can transmit data by the paired first wireless communication unit 12 and second wireless communication unit 22, so that image data generated by the arithmetic unit 11 can be transmitted to the display unit 21. Further, according to another embodiment of the present invention, the display unit 21 may be any kinds of touch screen (for example, the touch screen of capacitance type or resistance type). In this case, the display unit 21 can be used as a tablet computer. Here, the display unit 21 can receive touch from the user, transmit information related to the user's touch (for example, information of position of the touch) to the arithmetic unit 11 through the paired first wireless communication unit 12 and second wireless communication unit 22, so that the arithmetic unit 11 can respond to the user's touch, and send a response result to the display unit 21 by the paired first wireless communication unit 12 and second wireless communication unit 22.

Here, it is noted that the respective components in the first housing 1, the second housing 2 and the third housing 3 need power supply in the case that the first housing 1, the second housing 2 and the third housing 3 are separated with each other. Therefore, according to one embodiment of the present invention, a first power supply 13 for supplying power to the arithmetic unit 11 can be provided in the first housing 1, a second power supply 23 for supplying power to the display unit 21 can be provided in the second housing 2, and a third power supply 33 for supplying power to the input unit 31 can be provided in the third housing 3. Here, the first power supply 13, the second power supply 23 and the third power supply 33 can be implemented by any kinds of chargeable battery group.

Further, pairing of the first wireless communication unit 12 and the second wireless communication unit 22 and pairing of the first wireless communication unit 12 and the third wireless communication unit 32 can be executed in a boot procedure of the information processing apparatus. For example, apparatus ID of the wireless communication units corresponding to the arithmetic unit 11, the display unit 21 and the input unit 31 can be pre-defined in the factory setting of the information processing apparatus, that is, apparatus ID of wireless communication units corresponding to the arithmetic unit 11, the display unit 21 and the input unit 31 can be stored in the information processing apparatus. In this case, in the boot phase of the information processing apparatus, the arithmetic unit 11 can use the apparatus ID stored to search the wireless communication unit corresponding to the display unit 21 and the input unit 31 through the first wireless communication unit 12, and make a pairing in the case that the corresponding wireless communication unit is found. Here, since standby of the display unit 21 and the input unit 31 does not consume power generally, the second housing 2 and the third housing 3 can be configured so that the second power supply 23 and the third power supply 33 supply power to the second wireless communication unit 22 and the third wireless communication unit 32 continuously to allow the first wireless communication unit 1 corresponding to the arithmetic unit 11 to find them. Further, it is obvious that a switch can be provided on the second housing 2 and the third housing 3 to control the power supply of the second power supply 23 and the third power supply 33, and the switch is turned on to supply power when the user needs.

The case in which the first housing 1, the second housing 2 and the third housing 3 are separated with each other is described above, the case in which the first housing 1, the second housing 2 and the third housing 3 are connected with each other is described as follows.

In the case in which the first housing 1, the second housing 2 and the third housing 3 are connected with each other, the second housing 2 and the third housing 3 are connected together through the first connection unit 4, and the first housing 1 and the third housing 3 are connected together through the second connection unit 5. According to one embodiment of the present invention, a first flexible printed circuit (not shown) is provided on the first connection unit 4 so that data is exchanged via the first flexible printed circuit when the second housing 2 and the third housing 3 are connected through the first connection unit 4. Further, a second flexible printed circuit (not shown) is provided on the second connection unit 5 so that data is exchanged via the second flexible printed circuit when the first housing 1 and the third housing 3 are connected through the second connection unit 5. In this case, since the electric connection relation among the first housing 1, the second housing 2 and the third housing 3 is similar to the general notebook computer, it is only described simply here.

For example, a first flexible printed circuit can be provided within the first connection unit 4, and a second flexible printed circuit can be provided within the second connection unit 5. In this case, when the first housing 1, the second housing 2 and the third housing 3 are connected, the first flexible printed circuit and the second flexible printed circuit can implement a wire connection among the arithmetic unit 11, the display unit 21 and the input unit 31, thereby data can be exchanged among the arithmetic unit 11, the display unit 21 and the input unit 31. In this case, the information processing apparatus according to the embodiment of the present invention has a usage form of notebook. Further, the first flexible printed circuit and the second flexible printed circuit may also constitute a part of a charging path of the first power supply 13, the second power supply 23 and the third power supply 33.

The structure and operation of the information processing apparatus according to the embodiment of the present invention are described above. The information processing apparatus according to embodiment of the present invention can have a plurality of usage forms.

For example, as above described, in the case in which the first housing 1, the second housing 2 and the third housing 3 are connected with each other, the information processing apparatus has a usage form of a general notebook, and the arithmetic unit 11, the display unit 21 and the input unit 31 exchange data in a wire manner (as shown in FIG. 3).

Further, in the case in which the first housing 1, the second housing 2 and the third housing 3 are separated with each other, the arithmetic unit 11, the display unit 21 and the input unit exchange data in a wireless manner (as shown in FIG. 2). In this case, if the display unit 21 is a touch screen, the display unit 21 has a usage form of tablet (arithmetic processing is executed by the arithmetic unit 11).

Figure 4:
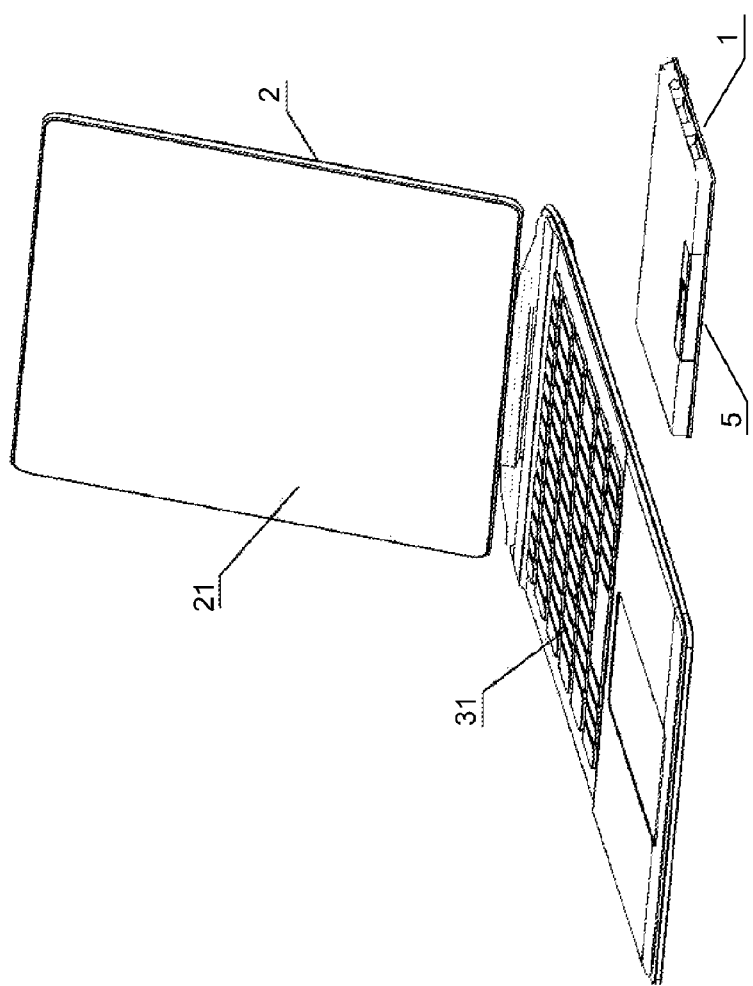
FIG. 4 is a schematic diagram illustrating another usage form of the information processing apparatus according to the embodiment of the present invention.

Further, in the case in which the second housing 2 and the third housing 3 are connected with each other, the arithmetic unit 11 exchanges data with the display unit 21 and the arithmetic unit 11 exchanges data with the input unit 31 in a wireless manner. In this case, since the first housing 1 containing the arithmetic unit 11 is separated from the second housing 2 and the third housing 3, and the arithmetic unit 11 generally occupies a certain volume and has a relative large weight, the second housing 2 and the third housing 3 constitute a usage form of ultra-light notebook computer (as shown in FIG. 4).

With the above-described configuration, the information processing apparatus according to the embodiment of the present invention has a plurality of usage forms, and can be switched among the above-described usage forms flexibly, therefore, the information processing apparatus according to the embodiment of the present invention can satisfy different usage requirements of the user easily.

In the above-described information processing apparatus, a main type is notebook computer. At present, the notebook computer (for short, notebook) has become the most common tool in people's daily life, and as compared with desktop computer, the most advantage of the notebook computer is the portability, further, it has advantages of energy-saving, greenness or the like.

In terms of hardware architecture, the notebook computer is substantially the same as the desktop computer, and is mainly constituted by the several parts of an input device, a host system and an output device. External information is input to the host through the input device and is analysed and parsed and processed by the host system and then output through the output device.

Due to difference of the design purpose, the notebook computer has an obvious difference as compared with the desktop computer, the design purpose of the notebook computer is to achieve stability, high capability, low power consumption and diversified function in precondition of ensuring portability, in contrast, the desktop computer focuses more on compatibility and performance, for the notebook computer, the most important is stability and portability rather than performance, and then is diversification of the function and performance.

In the twenty and several years since birth of the notebook computer, lightness and portability is always one of the most important trends of development, and is pursued by most consumers, ultrathin notebook computer is a notebook computer with highly light and thin design as the name implies, which has a smaller volume and a lighter weight, at the same time of pursuing ultrathin design, the pursue to higher performance of the consumer is also endless, and it makes more requirement of highly energy efficiency to the product, therefore, how to keep function and performance of the produce as conducting ultrathin design is always a technical problem for the development of the notebook computer.

It is well-known that the conventional notebook computer is a single structure of open-close type in which the input device and the host system are integrated together, and then linked with the output device with a pivot. The output device can be used by opening a certainty angle upwards around the pivot at the time of use, and when the notebook computer is not used, it is folded by covering the output device downwards on the body formed by the input device and the host system around the pivot.

The host system of the notebook computer of such structure is superimposed under the input device, and the thickness of the body mainly depends on a sum of the thicknesses of the two constituent parts. With the continuous development of the technique of the component of the notebook computer, the input device and the host system can be designed thinner increasingly, but when they are superimposed top-and-bottom, the resultant thickness of the body is still difficult to achieve an ultrathin degree, since the ultrathin design of a single constituent part has approached limitation, it desires the designer to find other ways to solve the ultrathin problem in terms of the entire form of the notebook computer.

The mainboard device of the host system of the notebook computer, as a most important constituent part in the notebook computer, will change along with the development of the entire form of the notebook computer inevitably.

Figure 5:
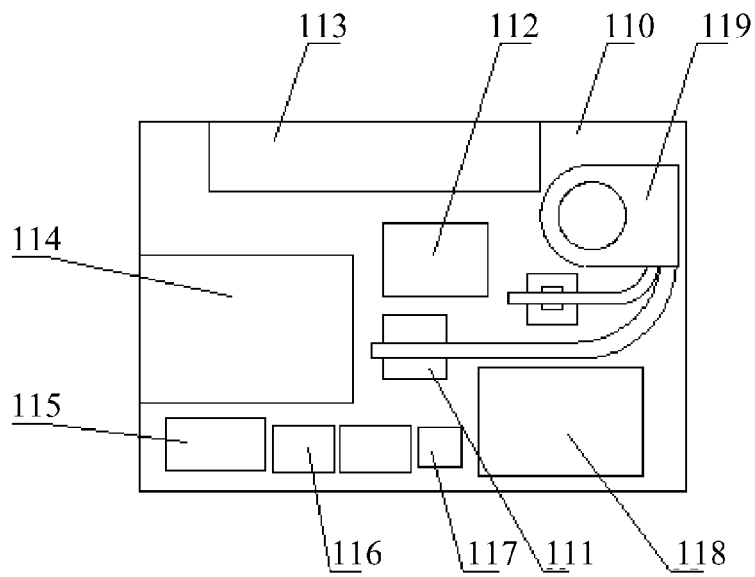
FIG. 5 is a schematic diagram of the structure of the host of the conventional notebook computer.

Referring to FIG. 5, which is schematic diagram of the structure of the host of the conventional notebook computer. Observed from the illustrated direction, a mainboard 110 thereof is generally a square, a CPU 111 and a memory component 112 are arranged at the central position of the mainboard 110, a battery 113 is arranged on an upper position of the memory component 112, a disc driver 114 is arranged on the left side of the CPU 111 and the memory component 112, peripheral members such as an interface member 115 and a wireless network card 116 or the like are arranged in parallel at the lower left corner of the mainboard 110, a mainboard chip 117 is at a lower position of the CPU 111, a hard disk 118 and a radiator module 119 are at a lower right corner and an upper right corner of the mainboard 110 respectively.

Such mainboard device is only suitably for the conventional notebook computer of open-close type, and can not fully satisfy the requirement of the development of the form of the notebook computer.

Therefore, how to improve the host of the notebook computer so as to satisfy the requirement of the development of the form of the notebook computer to make the notebook computer lighter and thinner is a technical problem that needs to be solved by those skilled in the art at present.

A still another aspect of the embodiments of the present invention provides a host. The relative position relations of the mainboard and the respective constituent parts on the mainboard of the host are re-designed, the improved layout thereof is more reasonable, impact, and significantly reduced in vertical size, so that the host can be arranged flexibly independent of the input device, the host can be positioned at a support location of the notebook computer by adjustment rather than integrated together with the relative thick input device top-and-bottom, thus the entire thickness of the notebook computer is significantly reduced, it achieves a real ultrathin effect in precondition of ensuring the performance of system.

The embodiments of the present invention may also provide a notebook computer provided with the above-described host.

In order to implement the above-described purpose, the embodiment of the present invention provides a host including:

A housing having a first surface of rectangular shape;

A mainboard of rectangular shape and at a central position of the housing whose width is substantially equal to width of the first surface of the housing and on which a CPU, a logic chip and a memory component are provided;

A radiator module provided at a side of the mainboard;

A hard disk, a periphery card and an interface member provided at the other side of the mainboard.

Preferably, the hard disk, the periphery card and the interface member are arranged specifically on a circuit board arranged in parallel with the mainboard in the length direction.

Preferably, the CPU and the memory components are arranged in width direction of the mainboard orderly.

Preferably, the CPU and the logic chip are arranged in length direction of the mainboard orderly.

Preferably, it further includes a wireless network card which is positioned specifically between the mainboard and the radiator module.

Preferably, the layout shows a transverse strip shape.

Preferably, the width thereof is a quarter to a half of the length.

The embodiments of the present invention further provide a notebook computer including a first housing for accommodating an arithmetic unit, a second housing for accommodating a display unit, a third housing for accommodating an input unit and a power supply unit and a pivot device, the pivot device connects with the first housing, the second housing and the third housing respectively and the first housing and the internal arithmetic unit thereof are specifically the above-described host.

Preferably, the pivot device includes a first pivot connected with the first housing and a second pivot connected with the second housing, the first pivot and the second pivot are provided on a base connected with the third housing.

Preferably, the battery and the disc driver of the notebook computer are provided within the third housing.

The host provided by the embodiments of the present invention make a further improvement on the basis of the prior arts, its components such as the logic chip, the radiator module, the hard disk, the periphery card and the interface component adopt a layout of transverse arrangement rather than being arranged around the CPU and the memory component, wherein the mainboard is at a central position on which the CPU, the logic chip and the memory component are provided, the radiator module is provided on one side of the mainboard and the hard disk, the periphery card and the interface component are provided on the other side, the battery and the disc driver are arranged at a position outside the mainboard, the improved layout thereof is more reasonable, impact and significantly reduced in vertical size, so that the host system can be arranged independent of the input device, and can be arranged at the support location of the notebook computer through adjustment rather than being integrated together with the relative thick input device top-and-bottom, which significantly reduces the entire thickness of the notebook computer, and achieves a real ultrathin effect in precondition of ensuring system performance.

In one specific implementation, the hard disk, the periphery card and the interface component are specifically arranged on a circuit board arranged in parallel with the mainboard in length direction, the circuit board is connected with the mainboard through the flexible breadboard. Thus, the above-described components can be divided into two groups and mounted on different circuit boards respectively, when one of the circuit boards and the components thereon fail, it would not influence the other circuit board and the components thereon, which not only facilitates manufacturing and assembling, and also facilitates detachment and maintenance.

The notebook computer provided by the embodiments of the present invention includes the above-described host, since the above-described host has the above-described technical effect, the notebook computer having the host will also have corresponding technical effect.

The embodiments of the present invention provide a host. The layout of the structure of the host is reasonable and impact, which suppresses the vertical size of the host system maximally, so as to significantly reduce the entire thickness of the notebook computer, which achieves the real ultrathin effect in precondition of ensuring system performance. Another embodiment of the present invention provides a notebook computer provided with the above-described host.

The above-described embodiments of the present invention are further explained in detail with reference to the accompanying drawings.

The following words representing orientations such as "upper", "bottom", "left", "right" or the like are based on the position relation in the accompanying drawings, which is only for the convenience of description, but should not be understood as an absolute definition of the scope sought for protection.

Figure 6:
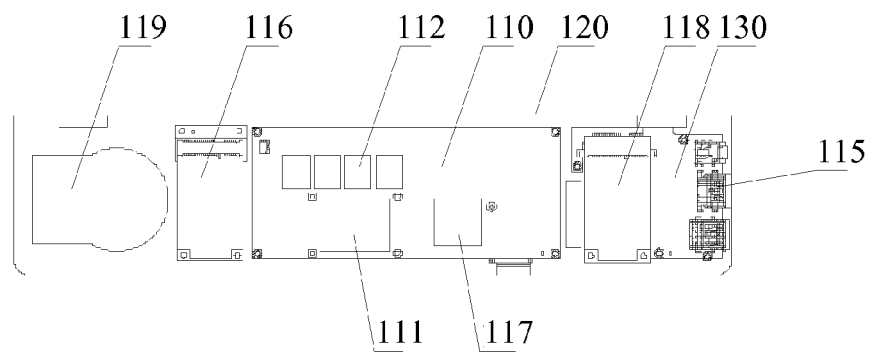
FIG. 6 is a schematic diagram of the structure of the host provided by the embodiments of the present invention.
Figure 7:
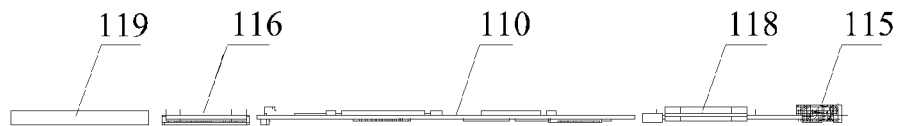
FIG. 7 is a bottom view of the host shown in FIG. 6.
Figure 8:
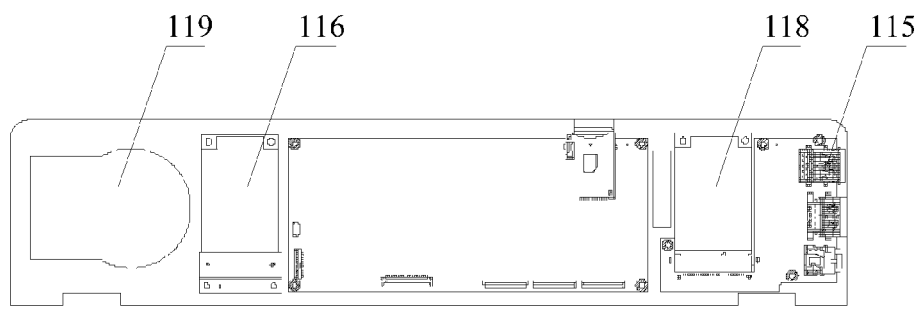
FIG. 8 is a schematic back view of the host shown in FIG. 6.

With reference to FIGS. 6, 7 and 8, FIG. 6 is schematic diagram of the structure of the host provided by the embodiments of the present invention, FIG. 7 is a bottom view of the host shown in FIG. 6, and FIG. 8 is a schematic back view of the host shown in FIG. 6.

As shown in the figures, in one specific implementation, the mainboard 110 of the host provided by the embodiments of the present invention is a relatively narrow rectangle which is approximately at the central position in a first housing 120 of the notebook computer, the CPU 111 and the mainboard chip 117 are arranged at left and right of a lower position of the mainboard in length direction of the mainboard 110 orderly, a transversely arranged memory component 112 is above the CPU 111. The mainboard 110 is at least divided into two layers, in order to reduce area of the mainboard, the signal such as command/control/elk/address or the like of the CPU 111 passes through the inner layer directly to the side (for example, the right side) of the memory component 112, and then transversely passes through and connects all of the memory grains of the memory component 112, thus all of the lines are short. Thus, it changes the arrangement that the signal such as command/control/elk/address or the like of the CPU passes the middle of the memory grain and then winds to one side and then transverses and connects all of the memory grains from the other side in the prior arts. As compared with the prior arts, the distance between the CPU and the memory is reduced and the distances between the respective chips are reduced so as to reduce the area of the mainboard.

Another circuit board 130 arranged in parallel in length direction is provided on right side of the mainboard 110, the component such as the hard disk 118, the interface component 115 and the periphery card or the like are provided on the circuit board 130, wherein the interface component 115 is at the right edge of the circuit board 130 so as to externally connect other apparatus via a port at the side surface of the host system 120. Here, the hard disk 118 is built in a rectangle gap on the circuit board 130 rather than overlapping on the circuit board 130 directly so as to avoid the increase of the thickness due to superposition.

The mainboard 110 and the circuit board 130 constitute a structure of discrete type in physical structure, which are connected with each other through a flexible breadboard (not shown in the diagram), the technical effect achieved is equivalent to an entire longer mainboard, however, when the above-described components are divided into two groups and mounted on different circuit boards respectively, when one of the circuit board and the components thereon fail, it would not influence the other circuit board and the components thereon, which not only facilitates manufacturing and assembling, but also facilitates detachment and maintenance.

The radiator module 119 is provided at the left side of the mainboard 110, a wireless network card 116 with a high power radiation is provided between the mainboard 110 and the radiator module 119, the radiating ports of the radiator module 119 are communicated with the CPU 111 and the mainboard chip 117 mounted on the mainboard 110 for carrying out heat radiation for the CPU 111 and the mainboard chip 117.

The wireless network card 116 and the radiator module 119 are fixed on the housing of the host system 120 rather than being mounted on the mainboard 110, which avoids the increase of the thickness due to the superposition similarly.

The mainboard, the radiator module as well as the periphery card and the interface component are not superimposed with each other.

With the above-described structure, the entire width of the host is approximately a quarter of the length, the aspect ratio of the first housing corresponds to the mainboard device, and the vertical size thereof is suppressed efficiently and shows a rectangle structure, which has a significant difference as compared with the conventional notebook computer in shape.

Figure 9:
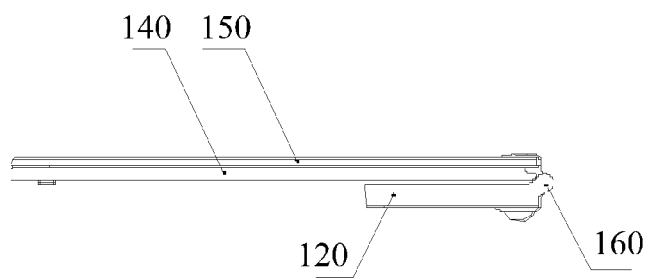
FIG. 9 is a schematic diagram of the structure of the notebook computer provided by the embodiments of the present invention.

With reference to FIG. 9, FIG. 9 is a schematic diagram of the structure of the notebook computer provided by the embodiments of the present invention.

In addition to the above-described host, the embodiments of the present invention further provide a notebook computer. The notebook computer includes a first housing 120 for accommodating an arithmetic unit, a second housing 150 for accommodating s display unit, a third housing 140 for accommodating an input unit and a power supply unit, and a pivot device 160, the first housing 120 is independent of the third housing 140, the width thereof is approximately one third of the width of the third housing 140, the pivot device 160 has two pivots, the base thereof is connected with the third housing 140, a first pivot is connected with the first housing 120, a second pivot is connected with the second housing 150 so as to implement linkage of the three constituent parts, the first housing 120 and the internal arithmetic unit are the above-described host, the battery and the disc driver are not provided within the first housing 120 but provided within the third housing 140, so as to leave enough space for the battery to extend the lifetime of the battery.

Figure 10:
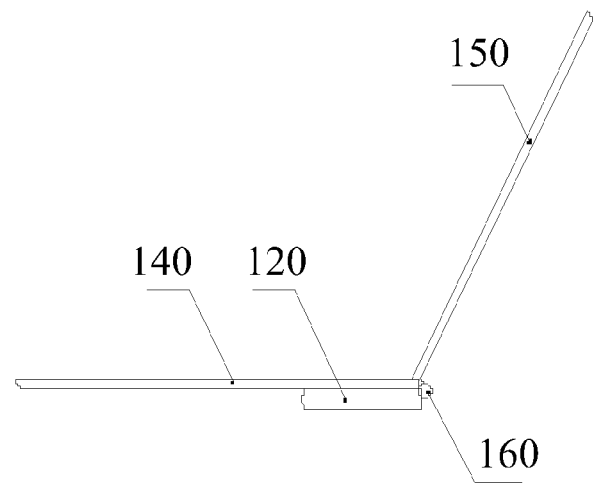
FIG. 10 is a side view of the notebook computer when the first housing is withdrawn completely.
Figure 11:
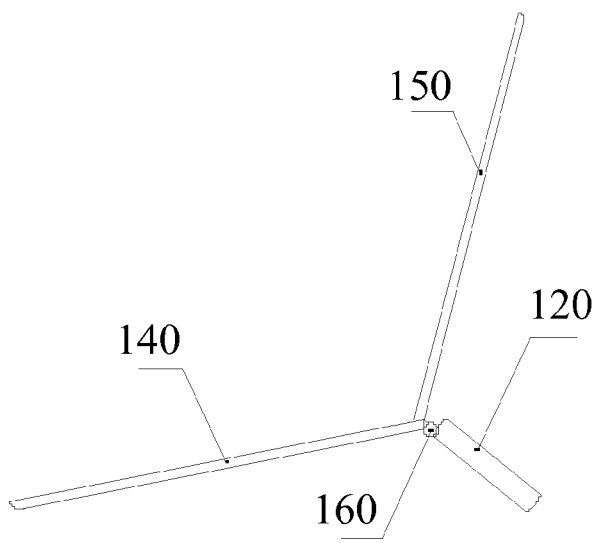
FIG. 11 is a side view of the notebook computer when the first housing is opened to a certain angle.
Figure 12:
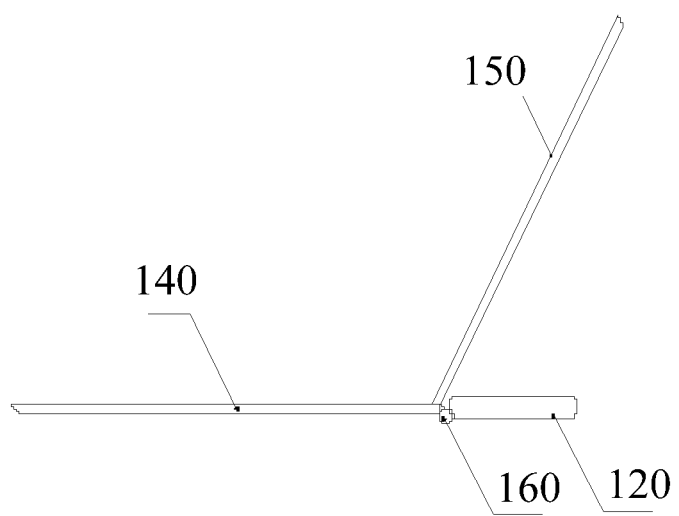
FIG. 12 is a side view of the notebook computer when the first housing is opened completely.

With reference to FIGS. 10, 11 and 12, FIG. 10 is a side view of the notebook computer when the first housing is withdrawn completely, FIG. 11 is a side view of the notebook computer when the first housing is opened to a certain angle and FIG. 12 is a side view of the notebook computer when the first housing is fully opened.

The function implemented by the second pivot is substantially the same as the pivot of the conventional common notebook computer to make the second housing 150 to be capable of being opened upwards.

The first housing 120 can rotate around the first pivot and be withdrawn completely to be superimposed under the third housing 140, when the notebook computer is turned off and needs to be put in a notebook computer bag, the first housing 120 is folded to 0 degree to reduce the dimension of a notebook computer bag.

The first housing 120 can be fully opened to be at a same plane with the third housing 140, so as to use the space behind the second housing 150 sufficiently, it significantly reduces the entire thickness of the notebook computer, which achieves the real ultrathin effect in precondition of ensuring system performance.

Of course, the main function of the first pivot is supporting under the third housing 140 when the first housing 120 is opened to a certainty angle to function as a brace, the user can adjust an elevation of the operational interface as necessary to a best usage angle that the user feels comfortable.

Here, those skilled in the art can understand, though the configuration of the host according to the embodiment of the present invention is described by taking the notebook computer as example, in addition to being applied to the above-mentioned first housing of the information processing apparatus according to the embodiment of the present invention, it can be applied to the host part of other information processing apparatus.

And, the configuration of the host according to the embodiment of the present invention described by taking the notebook computer as example and the configuration of the information processing apparatus described with reference to FIGS. 1 to 4 can be used in combination, and can be used separately to the information processing apparatus such as notebook computer, the embodiments of the present invention are not intended to make any limitation thereto.

When they are used in combination, the embodiments of the present invention provides an information processing apparatus including:

A first housing configured to accommodate an arithmetic unit;

A second housing configured to accommodate a display unit;

A third housing configured to accommodate a input unit;

A first connection unit configured to connect the second housing and the third housing separably; and A second connection unit configured to connect the first housing and the third housing separably;

Wherein, when the first housing, the second housing and the third housing are separated with each other, the display unit and the arithmetic unit exchange data in a wireless manner and the input unit and the arithmetic unit exchange data in a wireless manner;

Wherein, the first housing has a first surface of rectangle; and

The Arithmetic Unit Includes:

A mainboard of rectangle and being at a central position of the housing and whose width is substantially equal to width of the first surface of the housing and on which a CPU, a logic chip and a memory component are provided;

A radiator module provided at one side of the mainboard;

A hard disk, a periphery card and an interface component provided at the other side of the mainboard.

In the above-described information processing apparatus, the hard disk, the periphery card and the interface component are specifically arranged on a circuit board arranged in parallel with the mainboard in length direction.

In the above-described information processing apparatus, the CPU and the memory component are arranged in width direction of the mainboard orderly.

In the above-described information processing apparatus, the CPU and the logic chip are arranged in length direction of the mainboard orderly.

In the above-described information processing apparatus, it further includes a wireless network card which is specifically positioned between the mainboard and the radiator module.

In the above-described information processing apparatus, the layout thereof shows a transverse strip shape, wherein the mainboard, the radiator module as well as the hard disk and the periphery card and the interface component are not provided overlapped with each other.

In the above-described information processing apparatus, the width thereof is a quarter to a half of the length.

In the above-described information processing apparatus, the first connection unit is the first pivot, and the second connection unit is the second pivot, the first pivot and the second pivot are provided on a base connected with the third housing.

In the above-described information processing apparatus, the battery and the disc driver of the information processing apparatus are provided in the third housing.

Here, those skilled in the art can understand that, the mainboard and radiator module in the above description correspond to the mainboard component and the radiator component in the information processing apparatus described with reference to FIG. 1 to FIG. 4 respectively, and the hard disk and the periphery card can belong to the storage component, and the interface component can belong to the display output component.

It should note that, in the specification, the terms "comprise", "include" and any other variations thereof intend to cover nonexclusive inclusion so that the procedure, the method, the product or the equipment including a series of elements not only include these elements, but also include other elements which are not listed explicitly, or also include inherent elements of these procedure, method, product or equipment. In the case that there is no further limitation, elements defined by the expressions "comprise one . . . " does not exclude there being additional identity elements in the procedure, method, product or equipment of the elements.

Finally, it should note that, the above-described series of processing not only comprises processing executed chronologically in the order mentioned here, and also comprises processing executed parallelly or individually but not chronologically.

Those skilled in the art can understand that the units and algorithm steps of respective examples described in combination with the embodiments disclosed in the specification can be implemented by electronic hardware, computer software or the combination of both, in order to explain the interchange ability of the hardware and the software, the constitutions and steps of the respective examples are described generally according to the function in the above description. Whether the functions are executed by hardware or software depends on the specific applications and design constraint of the technical solution. Those skilled in the art can implement the described function by using different methods for each specific application, and such implementations are not regarded as beyond the scope of the present invention.

Though some embodiments of the present invention are shown and described, those skilled in the art should understand, these embodiment can be carried out with various modifications without departing from the principles and spirits of the present invention, and such modifications should fall into the scope of the present invention.

The invention claimed is:

1. An information processing apparatus, including:
   a first housing configured to accommodate an arithmetic unit;
   a second housing configured to accommodate a display unit;
   a third housing configured to accommodate an input unit;
   a first wireless communication unit in the first housing;
   a second wireless communication unit in the second housing; and
   a third wireless communication unit in the third housing;
   a first connection unit configured to removably connect the second housing and the third housing and comprising a first circuit; and
   a second connection unit configured to removably connect the first housing and the third housing and comprising a second circuit,
   wherein when the first housing, the second housing and the third housing are separated from each other, the display unit and the arithmetic unit exchange data through the first wireless communication unit and the second wireless communication unit and the input unit and the arithmetic unit exchange data through the first wireless communication unit and the third wireless communication unit,
   wherein when the first housing and the third housing are connected through the second connection unit, the arithmetic unit and the input unit exchange data via the second circuit; when the second housing and the third housing are connected through the first connection unit, the display unit and the input unit exchange data via the first circuit.

2. The information processing apparatus according to claim 1, wherein: a first end of the first connection unit is connected with the second housing in a push and pull manner, and/or, a second end of the first connection unit is connected with the third housing through a push and pull manner.

3. The information processing apparatus according to claim 1, wherein:
   the second connection unit connects the first housing and the third housing by magnetic attraction; and
   a first portion of the second connection unit is arranged on the first housing, and a second portion of the second connection unit is arranged on the third housing.

4. The information processing apparatus according to claim 1, wherein: a first portion of the second connection unit is magnetic; and a second portion of the second connection unit is a magnetic core.

5. The information processing apparatus according to claim 1, wherein: the arithmetic unit includes a mainboard component, a processor component, a radiator component, a display output component and a storage component.

6. The information processing apparatus according to claim 1, wherein: the display unit is a touch screen.

7. The information processing apparatus according to claim 1, further comprising:
   a first power supply unit configured to supply power to the arithmetic unit in the first housing; and
   a second power supply unit configured to supply power to the display unit in the second housing.

8. The information processing apparatus according to claim 1, wherein:
   the first housing has a first surface of rectangular shape;
   the arithmetic unit includes:
      a mainboard of rectangular shape and being at a central position of the housing and having a width substantially equal to a width of the first surface of the housing and on which a computer processing unit ("CPU"), logic chip and memory component are provided;
      a radiator module provided at one side of the mainboard; and
      a hard disk, a periphery card and an interface component provided at another side of the mainboard.

9. The information processing apparatus according to claim 8, wherein the hard disk, the periphery card and the interface component are arranged on a circuit board in parallel with the mainboard in a length direction.

10. The information processing apparatus according to claim 8, wherein the CPU and the memory component are arranged in a width direction of the mainboard.

11. The information processing apparatus according to claim 10, wherein the CPU and the logic chip are arranged in a length direction of the mainboard.

12. The information processing apparatus according to claim 8, further comprising a wireless network card positioned between the mainboard and the radiator module.

13. The information processing apparatus according to claim 12, wherein the arithmetic unit layout has a transverse strip shape, and the mainboard, the radiator module are arranged to not overlap with the hard disk, the periphery card and the interface component.

14. The information processing apparatus according to claim 13, wherein a width of the arithmetic unit is a quarter to a half of a length of the arithmetic unit.

15. The information processing apparatus according to claim 1, wherein the first connection unit is a first pivot, and the second connection unit is the second pivot, the first pivot and a second pivot are provided on a base connected with the third housing.

16. The information processing apparatus according to claim 8, wherein a battery and a disc driver of the information processing apparatus are provided within the third housing.

\* \* \* \* \*